G. A. McCOMBE.
UNIVERSAL JOINT.
APPLICATION FILED SEPT. 13, 1917.
1,307,743.
Patented June 24, 1919.
Fig. 1.
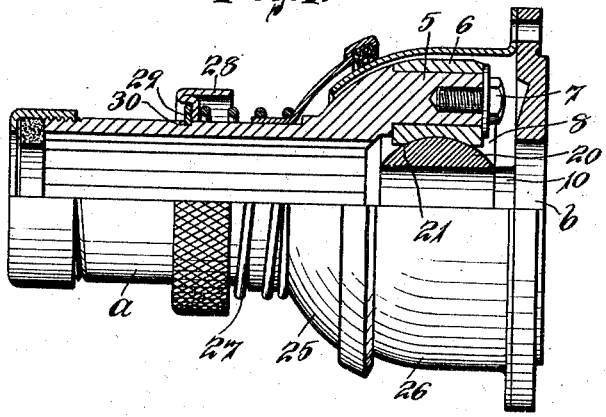
Fig. 2.
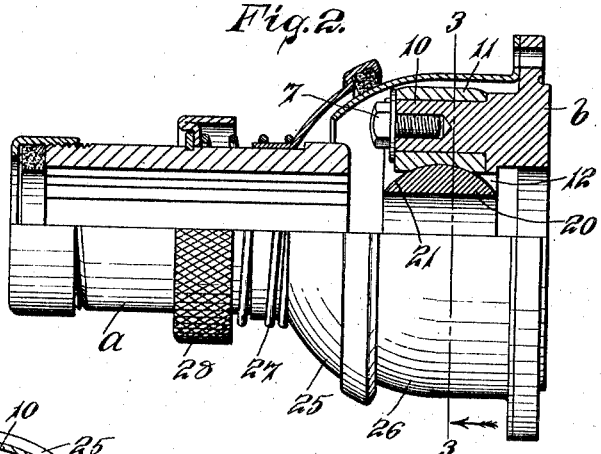
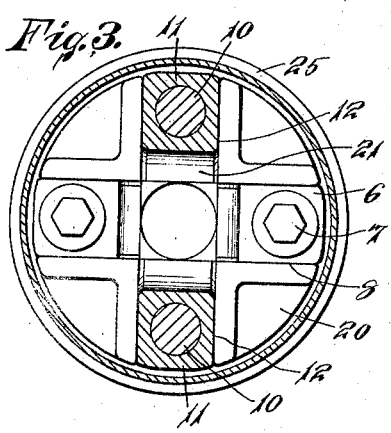
Fig. 4.   Fig. 5.
INVENTOR.
George A. McCombe:
BY
ATTORNEY.

UNITED STATES PATENT OFFICE.

GEORGE A. McCOMBE, OF HARTFORD, CONNECTICUT, ASSIGNOR TO THE HARTFORD AUTOMOTIVE PARTS COMPANY, OF HARTFORD, CONNECTICUT, A CORPORATION OF CONNECTICUT.

UNIVERSAL JOINT.

1,307,743.    Specification of Letters Patent.    Patented June 24, 1919.

Application filed September 13, 1917. Serial No. 191,132.

*To all whom it may concern:*

Be it known that I, GEORGE A. McCOMBE, a subject of the King of England, and a resident of Hartford, in the county of Hartford, State of Connecticut, have invented certain new and useful Improvements in Universal Joints, of which the following is a specification.

The object of this invention is to produce a universal joint having features of novelty and advantage.

One embodiment of the invention is shown in the drawings where—

Figure 1 is a side elevation of a complete joint partly in section.

Fig. 2 is a view similar to Fig. 1 showing the same parts but turned at an angle of 90°.

Fig. 3 is a sectional view, except for the connecting block, on the line of 3, 3, of Fig. 2 looking in direction of the arrow.

Figs. 4 and 5 are detail views of one of the wearing blocks.

The structure comprises the usual shaft members *a*, *b*, of a universal joint, one of which is shown as a plate for attachment to a complementary part. The forms which these shaft members may take are immaterial so far as this invention is concerned.

Each of these shaft members is provided with the usual pairs of diametrically opposite horns 5, 5, and 10, 10, preferably integrally and arranged in parallelism with the axes of the shaft member.

On the horns are mounted hardened wearing blocks 6, 6, and 11, 11 which may be conveniently held in place as by the screws 7, 7.

20, is the connecting block, preferably a solid forging, provided in its periphery with two pairs of diametrically opposite recesses 8, 8, and 12, 12 to receive the blocks 6, 6, and 11, 11 which fit snugly therein but are free to move relatively therein to accommodate the movements of the joint.

The block 20 at the bottom of each recess is of cylindrical form, as illustrated at 21, and the inner faces of the wearing blocks 6, 6, and 11, 11 are shaped to fit these cylindrical surfaces, thus providing bearings upon which the angular movements of the shaft members may take place. The inner faces of each pair of wearing blocks being in engagement with diametrically disposed portions of the curved cylindrical surfaces of the connecting block, these inter-engaging curved surfaces serve additionally to hold the shaft members in assembled relations.

The torsional strains are all transmitted by the solid connecting block which is directly engaged by the pairs of horns of each shaft member. All connection pins, or driving pins, or studs are thus eliminated, the shaft members themselves directly engage the block and the power is transmitted through the solid connection block. This means that each horn is supported or backed up by all of the other horns which means that the wear is always evenly distributed between the four horns and the strength of the joint and its ability to transmit torsional strains is greatly increased. It will be seen that all of the wear in this structure takes place between the wearing blocks and the connecting block, and that the main forgings are not subjected to any wear whatsoever. The result is that in case it is necessary to replace worn parts all that is needed is to substitute new wearing blocks and a new connecting block. This reduces the expense of repairing the joint to a minimum, if any such necessity arises.

A dust cap comprising the parts 25, 26, is provided for the protection of the joint and the movable part 25 is held in place on one shaft member by a spring 27 bearing against a collar 28 which is locked to the shaft member as by the keys 29 which enter the circumferential groove 30.

In accordance with the provisions of the patent statutes I have described the principle of operation of my invention, together with the apparatus which I now consider to represent the best embodiment thereof; but I desire it to be understood that the apparatus shown is only illustrative, and the invention can be carried out by other means.

I claim as my invention:—

1. In a device of the character described, coöperating shaft members provided with pairs of diametrically opposite horns, a connecting block provided with lengthwise slots having parallel sidewalls within which said horns are fitted, and means separable from and movable with said horns and interposed between said horns and connecting block for maintaining the engagement of said horns and connecting block.

2. In a device of the character described coöperating shaft members provided with pairs of diametrically opposite horns, wearing blocks fitted and secured to the ends of said horns, a connecting block provided in its periphery with suitable lengthwise slots in which said wearing blocks are movably positioned, means for fastening said wearing blocks to said horns, and inter-locking bearing surfaces on said wearing blocks and said connecting block.

3. In a device of the character described coöperating shaft members provided with pairs of diametrically opposite horns, wearing blocks fastened to the ends of said horns, a connecting block provided in its periphery with lengthwise slots to receive said wearing blocks, curved bearing faces formed at said connecting block in the bottom of said slots, the inner faces of said wearing blocks being curved to fit the curved surfaces of said connecting block.

4. In a device of the character described coöperating shaft members each provided with a pair of diametrically opposite horns, wearing blocks fastened to said horns, a disk shaped connecting block provided in its periphery with lengthwise slots within which said wearing blocks are fitted, and coöperating curved bearing surfaces on said wearing blocks and said connecting block.

5. In a device of the character described coöperating shaft members provided with pairs of diametrically opposite horns, wearing blocks fastened thereto provided with flat side and curved inner bearing surfaces, and a connecting block peripherally slotted to receive said wearing blocks, the side and bottom faces of said slot being shaped similarly to the corresponding coöperating faces of said wearing blocks.

6. In a device of the character described coöperating shaft members provided with pairs of diametrically opposite horns, a connecting block with longitudinal slots in its periphery the bottoms of which are curved in the direction lengthwise of the slots, and wearing blocks fastened to said horns and fitted to the curvature of the walls of the slots.

7. In a device of the character described coöperating shaft members provided with pairs of diametrically opposite horns, a connecting block with peripheral slots having parallel side walls and a curved bottom wall, and wearing blocks fastened to said horns and fitted into said slots the sides of said blocks being parallel and the inner surface curved to fit the bottom of the slots.

8. A universal joint comprising two main forgings adapted to be connected to shaft sections, each provided with diametrically opposite horns parallel with the axis of the forgings, wearing blocks apertured to receive the ends of said horns and upon which they are removably fastened in place, and a connecting block provided with lengthwise peripheral slots within which said wearing blocks are positioned for movement to accommodate the movements of the main forgings.

9. In a device of the character described, coöperating shaft members provided with pairs of diametrically opposite horns, a connecting block having lengthwise slots, and wearing members receiving said horns and movable lengthwise of said slots, said wearing members being interposed between said horns and connecting block.

10. In a device of the character described coöperating shaft members provided with diametrically opposite horns, a separate block fitted to each horn, a connecting block provided in its periphery with lengthwise slots in which said wearing blocks move longitudinally, and interlocking bearing faces on said wearing blocks and said connecting blocks and maintaining the engagement of said horns and connecting block.

11. In a device of the character described, coöperating shaft members provided with pairs of diametrically opposite horns, a connecting block having lengthwise slots each provided with a curved bearing face at its bottom, and wearing members receiving said horns and movable lengthwise of said slots, said wearing members being interposed between said horns and connecting block and having their inner faces curved to fit the curved surfaces of said connecting block, the intermediate portions of the curved surfaces of each pair of wearing members being in engagement with diametrically disposed portions of the curved surfaces of the connecting block.

12. In a device of the character described, coöperating shaft members each provided with a pair of diametrically opposite horns, a wearing member secured to but removable from each of said horns, a connecting block provided with lengthwise slots within which said wearing members are fitted to move lengthwise, and diametrically disposed coöperating curved surfaces on the inner faces of each pair of said wearing members and on the bottoms of the slots of said connecting block.

GEORGE A. McCOMBE.

Copies of this patent may be obtained for five cents each, by addressing the "Commissioner of Patents, Washington, D. C."